US012112681B2

(12) United States Patent
Scardato et al.

(10) Patent No.: US 12,112,681 B2
(45) Date of Patent: Oct. 8, 2024

(54) ELECTRONIC DEVICES WITH DISPLAYS AND INTERPOSER STRUCTURES

(71) Applicant: Apple Inc., Cupertino, CA (US)

(72) Inventors: Steven M Scardato, Sunnyvale, CA (US); Baris Cagdaser, Sunnyvale, CA (US); Patrick B Bennett, San Leandro, CA (US); Michael Slootsky, Santa Clara, CA (US); Alejandro X Levander, El Granada, CA (US); Henry C Jen, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/825,367

(22) Filed: May 26, 2022

(65) Prior Publication Data

US 2023/0062202 A1 Mar. 2, 2023

Related U.S. Application Data

(60) Provisional application No. 63/240,311, filed on Sep. 2, 2021.

(51) Int. Cl.
*G09G 3/20* (2006.01)

(52) U.S. Cl.
CPC ... *G09G 3/2092* (2013.01); *G09G 2300/0408* (2013.01); *G09G 2300/0426* (2013.01)

(58) Field of Classification Search
CPC ......... G09G 3/2092; G09G 2300/0408; G09G 2300/0426; G09G 2330/045; G09G 2380/02
See application file for complete search history.

(56) References Cited

U.S. PATENT DOCUMENTS

| | | | | |
|---|---|---|---|---|
| 5,959,709 | A | 9/1999 | Asada et al. | |
| 6,086,441 | A | 7/2000 | Akiguchi et al. | |
| 6,664,942 | B1 | 12/2003 | Kim et al. | |
| 9,009,457 | B2 * | 4/2015 | O'Mullan | G06F 21/572 713/2 |
| 9,397,117 | B2 | 7/2016 | Okamoto et al. | |
| 9,756,733 | B2 * | 9/2017 | Drzaic | H05K 1/189 |
| 9,829,710 | B1 * | 11/2017 | Newell | H10K 50/858 |
| 10,170,711 | B2 | 1/2019 | Sauers et al. | |
| 10,219,386 | B2 | 2/2019 | Drzaic et al. | |
| 10,921,855 | B1 * | 2/2021 | Wen | G09G 3/3275 |

(Continued)

*Primary Examiner* — Jose R Soto Lopez
(74) *Attorney, Agent, or Firm* — Treyz Law Group, P.C.; Joseph F. Guihan; Jinie M. Guihan

(57) ABSTRACT

An electronic device may have a display. The display may include an array of pixels formed on a silicon substrate. Display driver circuitry may be formed in a display driver integrated circuit that outputs display data and other control signals for operating the display. An interposer structure may be included in the electronic device. The interposer structure may be attached to the silicon display substrate and may only partially overlap the silicon display substrate. The display driver integrated circuit may be attached to the interposer structure and provide signals to the display pixels through the interposer structure. In another possible arrangement, the display driver integrated circuit may bridge a gap between the silicon display substrate and the flexible printed circuit. The display driver integrated circuit only partially overlaps the silicon display substrate in this arrangement.

20 Claims, 5 Drawing Sheets

(56) References Cited

U.S. PATENT DOCUMENTS

| | | | | |
|---|---|---|---|---|
| 10,985,143 | B2 | 4/2021 | Bower et al. | |
| 2002/0024302 | A1 | 2/2002 | Wu et al. | |
| 2006/0268530 | A1 | 11/2006 | Nagao et al. | |
| 2006/0284821 | A1* | 12/2006 | Takenaka | G09G 3/006 345/100 |
| 2007/0273632 | A1* | 11/2007 | Kishimoto | G09G 3/20 345/98 |
| 2010/0045655 | A1* | 2/2010 | Jang | G09G 3/20 345/213 |
| 2011/0050759 | A1* | 3/2011 | Katsutani | G09G 3/3677 345/694 |
| 2011/0279128 | A1* | 11/2011 | Von Staudt | G09G 3/006 324/538 |
| 2012/0217982 | A1* | 8/2012 | Narayanasamy | G06F 3/016 324/686 |
| 2013/0082984 | A1 | 4/2013 | Drzaic et al. | |
| 2013/0176552 | A1* | 7/2013 | Brown | H04N 25/70 356/51 |
| 2014/0035114 | A1* | 2/2014 | Gogoi | H01L 25/0652 257/676 |
| 2015/0187707 | A1* | 7/2015 | Lee | H01L 21/02112 324/663 |
| 2015/0296580 | A1* | 10/2015 | Kim | G09G 3/3426 315/294 |
| 2016/0071478 | A1* | 3/2016 | Takahashi | H01L 27/124 345/212 |
| 2016/0140882 | A1* | 5/2016 | Doebelt | G06F 3/0412 361/749 |
| 2016/0189668 | A1* | 6/2016 | Kang | G09G 5/006 345/214 |
| 2016/0329386 | A1 | 11/2016 | Sauers et al. | |
| 2017/0010638 | A1* | 1/2017 | Park | G06F 1/1643 |
| 2017/0084311 | A1* | 3/2017 | Kim | G06F 11/073 |
| 2017/0123896 | A1* | 5/2017 | Baek | G06F 11/1076 |
| 2017/0236466 | A1* | 8/2017 | Spitzer | G09G 3/3266 345/560 |
| 2017/0352305 | A1* | 12/2017 | Chang | G09G 3/2085 |
| 2017/0367190 | A1* | 12/2017 | Drzaic | G09G 3/20 |
| 2018/0061294 | A1* | 3/2018 | Kim | G09G 3/367 |
| 2018/0081399 | A1* | 3/2018 | Kwon | G09G 5/00 |
| 2019/0012007 | A1* | 1/2019 | Kim | G06F 1/1626 |
| 2019/0019449 | A1* | 1/2019 | Pappas | G09G 3/32 |
| 2019/0036542 | A1* | 1/2019 | Wang | H03M 1/76 |
| 2019/0066571 | A1* | 2/2019 | Goward | H01L 23/49827 |
| 2019/0279558 | A1* | 9/2019 | Monestier | G09G 3/32 |
| 2019/0326367 | A1* | 10/2019 | Jung | G06V 40/13 |
| 2020/0020644 | A1* | 1/2020 | Lee | G06F 30/398 |
| 2020/0142540 | A1* | 5/2020 | Rahmani | H05K 1/111 |
| 2020/0211477 | A1* | 7/2020 | Lai | G09G 3/3258 |
| 2020/0356488 | A1* | 11/2020 | Malladi | G11C 5/025 |
| 2021/0064090 | A1 | 3/2021 | Wen et al. | |
| 2021/0225430 | A1* | 7/2021 | O | G06F 13/1668 |
| 2021/0234079 | A1* | 7/2021 | Han | H01L 27/156 |
| 2021/0349599 | A1* | 11/2021 | Chen | G06F 3/04184 |
| 2021/0364861 | A1* | 11/2021 | Lum | G02F 1/133612 |
| 2022/0147101 | A1* | 5/2022 | Shin | G06F 1/1624 |
| 2022/0238498 | A1* | 7/2022 | Tsutsui | G11C 5/025 |
| 2022/0262320 | A1* | 8/2022 | Chang | G09G 3/3291 |
| 2022/0310000 | A1* | 9/2022 | David | G09G 3/3225 |
| 2022/0414815 | A1* | 12/2022 | Surti | G06T 9/00 |
| 2023/0266799 | A1* | 8/2023 | Kim | G06F 1/1637 345/156 |

* cited by examiner

ELECTRONIC DEVICES WITH DISPLAYS AND INTERPOSER STRUCTURES

This application claims priority to U.S. provisional patent application No. 63/240,311, filed Sep. 2, 2021, which is hereby incorporated by reference herein in its entirety.

BACKGROUND

This relates generally to electronic devices, and, more particularly, to electronic devices with displays.

Electronic devices often include displays. For example, an electronic device may have an organic light-emitting diode (OLED) display based on organic light-emitting diode pixels or a liquid crystal display (LCD) based on liquid crystal display pixels. The display may include display driver circuitry that is configured to provide display data to the pixels and gate driver circuitry that is configured to control the pixels.

It is within this context that the embodiments herein arise.

SUMMARY

An electronic device may have a display. The display may include an array of pixels formed on a silicon substrate. The display may include display driver circuitry that is configured to provide display data to the pixels and gate driver circuitry that is configured to control the pixels.

The display driver circuitry may be formed in a display driver integrated circuit that outputs display data and other control signals for operating the display. An interposer structure may be included in the electronic device. The interposer structure may be attached to the silicon display substrate and may only partially overlap the silicon display substrate. The display driver integrated circuit may be attached to the interposer structure and provide signals to the display pixels through the interposer structure. The interposer structure may have a first portion that is attached to the silicon display substrate, a second portion that is attached to the display driver integrated circuit, and a third portion that is attached to a flexible printed circuit.

In another possible arrangement, the display driver integrated circuit may bridge a gap between the silicon display substrate and the flexible printed circuit. The display driver integrated circuit only partially overlaps the silicon display substrate in this arrangement.

The silicon display substrate may be formed on a support structure that provides mechanical support for the display substrate. The support structure may be formed from a metal material and may also serve as a heat sink for the display substrate. The support structure may have an extension that extends past an edge of the silicon display substrate. A filler may be included between the support structure extension and the display driver integrated circuit and/or interposer.

DETAILED DESCRIPTION

Figure 1:
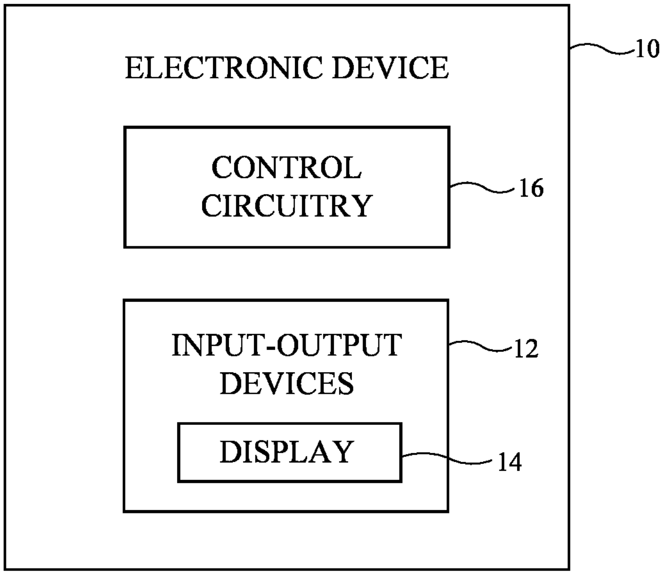
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. Control circuitry 16 may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Figure 2:
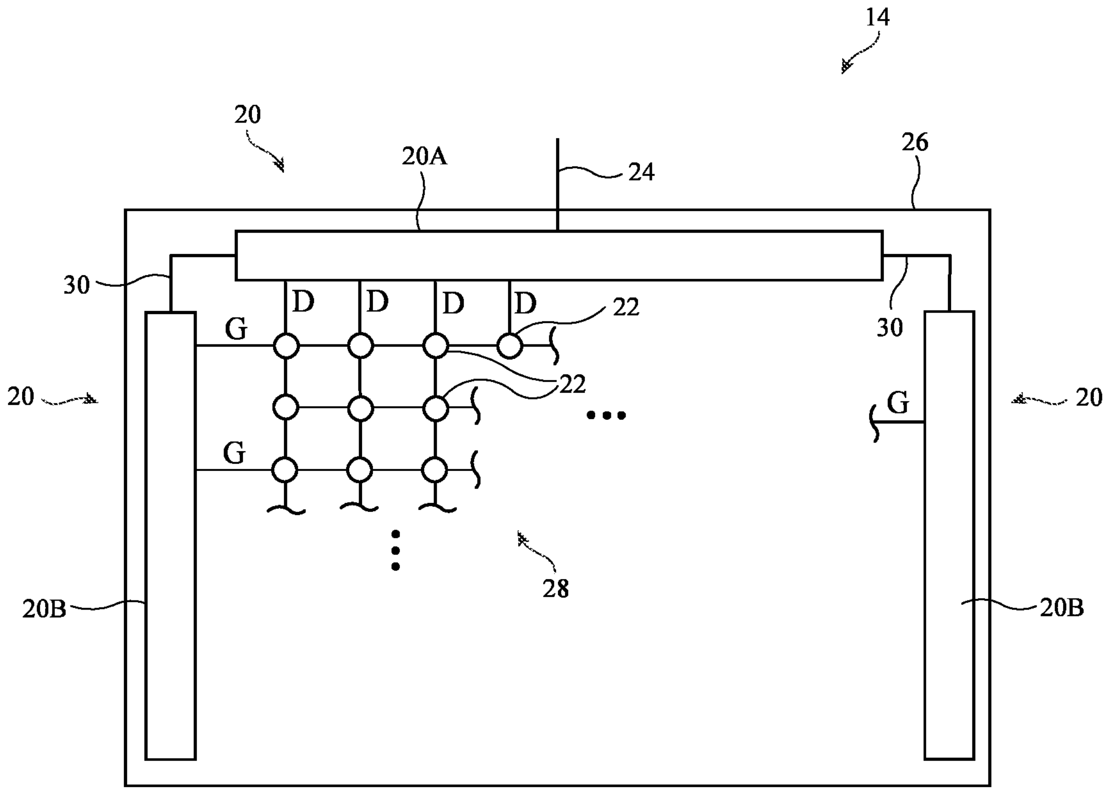
FIG. 2 is a schematic diagram of an illustrative display in accordance with an embodiment.

FIG. 2 is a diagram of an illustrative display 14. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels. Pixels of other colors such as cyan, magenta, and yellow might also be used.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally across display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Figure 3:
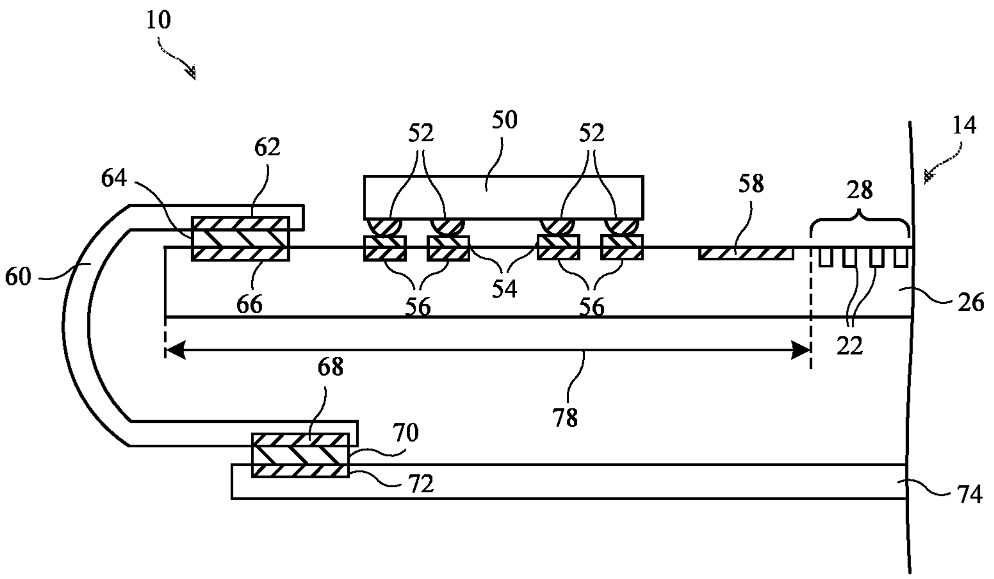
FIG. 3 is a cross-sectional side view of an illustrative electronic device with a display driver integrated circuit that is mounted directly on a display substrate in accordance with an embodiment.

FIG. 3 is a cross-sectional side view of an illustrative display. The display may include a substrate 26 formed from silicon. The silicon substrate may include circuitry (transistors) that is used to operate pixels 22. Using silicon as the material for substrate 26 may allow for display 14 to have a higher resolution and/or greater processing capabilities than if a different material such as glass or plastic is used for substrate 26.

Substrate 26 may include a plurality of contacts that are used to electrically connect circuitry within the substrate to additional components within the electronic device. One such contact is cathode contact 58. Cathode contact 58 is configured to electrically connect to a cathode layer for the display. The cathode layer may be present when display 14 includes organic light-emitting diode pixels, as an example. In an organic light-emitting diode display, organic light-emitting diode layers may be formed over substrate 26. Substrate 26 may include an array of anodes that contact the organic light-emitting diode layers. The cathode layer is formed over the organic light-emitting diode layers.

In the example of FIG. 3, a display driver integrated circuit (DDIC) 50 is included in the electronic device. The display driver integrated circuit 50 includes display driver circuitry for the display such as display driver circuitry 20A in FIG. 2. Display driver integrated circuit 50 is configured to provide data and other control signals to display 14 to control operations of pixels 22.

As shown in FIG. 3, display driver integrated circuit 50 may be mounted (attached) directly to silicon substrate 26. Display driver integrated circuit 50 includes contacts 52

(sometimes referred to as contact pads 52) that are configured to electrically connect to contacts 56 (sometimes referred to as contact pads 56 or bond pads 56) in substrate 26. Contacts 52 of display driver integrated circuit 50 may be bonded to contacts 56 of substrate 26 using conductive bonding structures 54 (sometimes referred to as conductive interconnect structures 54, conductive attachment structures 54, etc.). Conductive bonding structures 54 may be, for example, formed from anisotropic conductive films (ACF). A conductive bonding structure 54 is interposed between each respective contact 52 and contact 56. Conductive bonding structures 54 are used to bond DDIC 50 to substrate 26. The conductive bonding structures may form a physical and electrical connection between DDIC 50 and substrate 26.

Display driver integrated circuit 50 may receive signals from flexible printed circuit 60. The flexible printed circuit 60 may be coupled between substrate layer 26 and printed circuit board 74. Flexible printed circuit 60 may be formed from one or more dielectric layers formed from a flexible material such as polyimide. Metal traces may be printed on the one or more dielectric layers. Printed circuit board 74 may be, for example, a rigid printed circuit board (sometimes referred to as a motherboard).

Flexible printed circuit 60 includes one or more contacts 62 (sometimes referred to as contact pads 62) and one or more contacts 68 (sometimes referred to as contact pads 68). Contacts 62 are electrically connected to a respective contact 66 (sometimes referred to as contact pads 66 or bond pads 66) in substrate 26 by conductive bonding structures 64 (sometimes referred to as conductive interconnect structures 64, conductive attachment structures 64, etc.). Contacts 68 are electrically connected to a respective contact 72 (sometimes referred to as contact pads 72 or bond pads 72) in rigid printed circuit board 74 by conductive bonding structures 70 (sometimes referred to as conductive interconnect structures 70, conductive attachment structures 70, etc.). Conductive bonding structures 64 and 70 may be, for example, formed from anisotropic conductive films. A conductive bonding structure 64 is interposed between each respective contact 62 and contact 66. The conductive bonding structures 64 may form a physical and electrical connection between flexible printed circuit 60 and substrate 26. A conductive bonding structure 70 is interposed between each respective contact 68 and contact 72. The conductive bonding structures 70 may form a physical and electrical connection between flexible printed circuit 60 and rigid printed circuit board 74.

During operations of the electronic device of FIG. 3, signals for operating the display (e.g., control signals and/or display data) may be provided from control circuitry within rigid printed circuit board 74 to flexible printed circuit 60. The flexible printed circuit 60 conveys the signals to substrate 26 (e.g., to contact pads 66). Thereafter, display driver integrated circuit 50 receives the signals from substrate 26 (e.g., from some of the contact pads 56). Display driver integrated circuit 50 may output corresponding signals for operating the display to substrate 26 (e.g., to some of the contact pads 56). The signals from display driver integrated circuit 50 may subsequently be used by circuitry within substrate 26 to operate the display.

In FIG. 3, display driver integrated circuit 50 completely overlaps silicon layer 26. Accordingly, the footprint of silicon layer 26 needs to be sufficiently large to accommodate the footprint of display driver integrated circuit 50. As shown in FIG. 3, there is a distance 78 between the edge of the pixel array (e.g., a light-emitting active area for the display) and an edge of substrate 26. In FIG. 3, distance 78 needs to be sufficiently large to accommodate cathode contact 58, contact pads 56 that couple to the display driver integrated circuit that completely overlaps the substrate, and contact pads 66 that couple to the flexible printed circuit that partially overlaps the substrate.

It may be desirable to reduce the magnitude of distance 78. Because substrate 26 in FIG. 3 is formed from silicon, substrate 26 may be formed using a semiconductor manufacturing process. In the semiconductor manufacturing process, numerous silicon dice are formed in a larger silicon wafer. The silicon wafer is then diced to produce the individual silicon layers 26 that are of the appropriate size for display 14. There may be limits to the size of the silicon wafer that can be produced during the semiconductor manufacturing process. Accordingly, the larger the footprint of substrate 26 for display 14, the fewer silicon dice can be fit on the silicon wafer during manufacturing. To increase the number of silicon dice that fit on the silicon wafer during manufacturing, the footprint of substrate 26 may be decreased.

Figure 4:
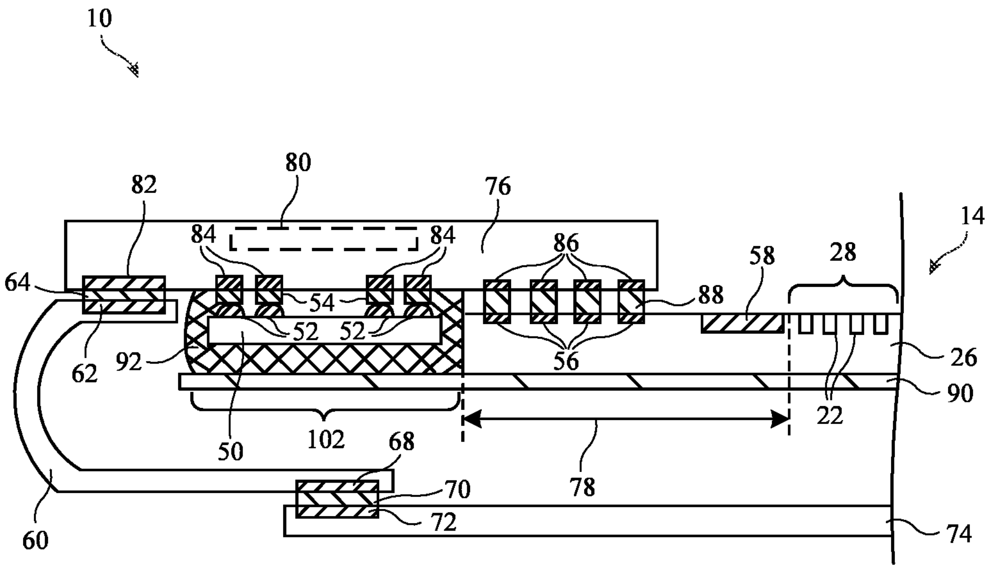
FIG. 4 is a cross-sectional side view of an illustrative electronic device with a display driver integrated circuit that is mounted to an interposer structure in accordance with an embodiment.

FIG. 4 is a cross-sectional side view of an illustrative display that uses an interposer to decrease the size of the footprint of substrate 26. In FIG. 4, the display may include a substrate 26 formed from silicon. The silicon substrate may include circuitry (transistors) that is used to operate pixels 22. Using silicon as the material for substrate 26 may allow for display 14 to have a higher resolution and/or greater processing capabilities than if a different material such as glass or plastic is used for substrate 26.

Substrate 26 may include a plurality of contacts that are used to electrically connect circuitry within the substrate to additional components within the electronic device. One such contact is cathode contact 58. Cathode contact 58 is configured to electrically connect to a cathode layer for the display. The cathode layer may be used when display 14 includes organic light-emitting diode pixels, as previously described.

In the example of FIG. 4, display driver integrated circuit (DDIC) 50 is mounted on (attached to) an interposer 76. Display driver integrated circuit 50 includes display driver circuitry for the display such as display driver circuitry 20A in FIG. 2. Display driver integrated circuit 50 is configured to provide data and other control signals to display 14 to control operations of pixels 22.

As shown in FIG. 3, display driver integrated circuit 50 may be mounted directly on (bonded to) interposer 76. Interposer 76 may be formed from silicon or another desired material. Display driver integrated circuit 50 includes contacts 52 (sometimes referred to as contact pads 52) that are configured to electrically connect to contacts 84 (sometimes referred to as contact pads 84 or bond pads 84) in interposer 76. Contacts 52 of display driver integrated circuit 50 may be bonded to contacts 84 of interposer 76 using conductive bonding structures 54 (sometimes referred to as conductive interconnect structures 54, conductive attachment structures 54, etc.). Conductive bonding structures 54 may be, for example, formed from anisotropic conductive films or solder. A conductive bonding structure 54 is interposed between each respective contact 52 and contact 84. The conductive bonding structures 54 may form a physical and electrical connection between DDIC 50 and interposer 76.

Interposer 76 may receive signals from flexible printed circuit 60. The flexible printed circuit 60 may be coupled between interposer 76 and printed circuit board 74. Flexible printed circuit 60 includes one or more contacts 62 (sometimes referred to as contact pads 62) and one or more contacts 68 (sometimes referred to as contact pads 68). Contacts 62 are electrically connected to a respective contact 82 (sometimes referred to as contact pads 82 or bond pads 82) in interposer 76 by conductive bonding structures 64 (sometimes referred to as conductive interconnect structures 64, conductive attachment structures 64, etc.). Contacts 68 are electrically connected to a respective contact 72 (sometimes referred to as contact pads 72 or bond pads 72) in rigid printed circuit board 74 by conductive bonding structures 70 (sometimes referred to as conductive interconnect structures 70, conductive attachment structures 70, etc.). Conductive bonding structures 64 and 70 may be, for example, formed from anisotropic conductive films. A conductive bonding structure 64 is interposed between each respective contact 62 and contact 82. The conductive bonding structures 64 may form a physical and electrical connection between flexible printed circuit 60 and interposer 76. A conductive bonding structure 70 is interposed between each respective contact 68 and contact 72. The conductive bonding structures 70 may form a physical and electrical connection between flexible printed circuit 60 and rigid printed circuit board 74.

Interposer 76 may have a portion mounted on substrate 26. As shown in FIG. 4, interposer 76 includes contacts 86 (sometimes referred to as contact pads 86) that are configured to electrically connect to contacts 56 (sometimes referred to as contact pads 56 or bond pads 56) in substrate 26. Contacts 86 of interposer 76 may be bonded to contacts 56 of substrate 26 using conductive bonding structures 88 (sometimes referred to as conductive interconnect structures 88, conductive attachment structures 88, etc.). Conductive bonding structures 88 may be, for example, formed from anisotropic conductive films. A conductive bonding structure 88 is interposed between each respective contact 86 and contact 56. The conductive bonding structures 88 may form a physical and electrical connection between interposer 76 and substrate 26.

There may be an array of contacts 56 that are configured to be electrically connected to the interposer contacts 86 using conductive structures 88. There may be more than 1,000 total contacts 56, more than 3,000 total contacts 56, more than 5,000 total contacts 56, more than 7,000 total contacts 56, more than 8,000 total contacts 56, more than 9,000 total contacts 56, etc. The array of contacts 56 may have more than five rows, more than ten rows, more than twenty rows, more than thirty rows, etc. The array of contacts 56 may have more than 100 columns, more than 200 columns, more than 300 columns, more than 400 columns, etc.

During operations of the electronic device of FIG. 4, signals for operating the display (e.g., control signals and/or display data) may be provided from control circuitry within rigid printed circuit board 74 to flexible printed circuit 60. The flexible printed circuit 60 conveys the signals to interposer 76 (e.g., to contact pads 82). Thereafter, display driver integrated circuit 50 receives the signals from interposer 76 (e.g., from some of the contact pads 84 in interposer 76). Display driver integrated circuit 50 may output corresponding signals for operating the display to interposer 76 (e.g., to some of the contact pads 84 in interposer 76). Thereafter, the signals are conveyed from the interposer 76 to substrate 26 (e.g., to contact pads 56). The signals may subsequently be used by circuitry within substrate 26 to operate the display.

Interposer 76 therefore receive signals from the flexible printed circuit (e.g., at contacts 82), conveys the signals to DDIC 50 (e.g., using some of contacts 84), receives output signals from DDIC 50 (e.g., at some of contacts 84), and conveys the signals to substrate 26 (e.g., using contacts 86).

In FIG. 3, contacts are needed in substrate 26 to both provide signals to DDIC 50 and receive signals from DDIC 50. In FIG. 4, contacts are only needed to receive signals from DDIC 50 (from intervening interposer 76).

In FIG. 3, a contact 66 is present in substrate 26 to electrically connect to the flexible printed circuit 60. In FIG. 4, this contact is omitted (and instead the flexible printed circuit is connected to interposer 76).

Due to the omission of these components on substrate 26 in FIG. 4, the footprint of silicon layer 26 in FIG. 4 only needs to be sufficiently large to accommodate the partial footprint of interposer 76. In FIG. 4, display driver integrated circuit 50 does not overlap silicon layer 26. Interposer 76 only partially overlaps silicon layer 26. As shown in FIG. 4, there is a distance 78 between the edge of the pixel array (e.g., a light-emitting active area for the display) and an edge of substrate 26. In FIG. 4, distance 78 needs to be sufficiently large to accommodate cathode contact 58 and contact pads 56 that couple to the interposer that partially overlaps the substrate. Distance 78 in FIG. 4 is less than distance 78 in FIG. 3 due to the space saved by omitting the contact pads for the flexible printed circuit (e.g., contacts 66 in FIG. 3) and by omitting some of contacts 56 for the display driver integrated circuit.

Distance 78 in FIG. 4 may be less than 10 millimeters, less than 5 millimeters, less than 3 millimeters, less than 2 millimeters, less than 1 millimeter, greater than 1 millimeter, between 2 millimeters and 5 millimeters, etc. The smaller footprint of substrate 26 in FIG. 4 relative to FIG. 3 allows for more silicon dice to fit on a silicon wafer during manufacturing.

To ensure the mechanical reliability of the interposer 76 and DDIC 50 in FIG. 4, a support structure extension may be present. As shown in FIG. 4, a support structure 90 may be present below substrate 26. Support structure 90 may physically support substrate 26 within the electronic device. Support structure 90 may also be formed from a thermally conductive material and therefore serve as a heat sink for substrate 26. Support structure 90 may therefore sometimes be referred to as heat sink structure 90 or heat sink 90. Support structure 90 may have a thermal conductivity (in units of $W \times m^{-1} \times K^{-1}$) that is greater than 50, greater than 100, greater than 200, greater than 300, greater than 400, greater than 500, etc.

As shown in FIG. 4, support structure 90 may have an extension 102 that extends past an edge of substrate 26. Extension 102 may be formed under display driver integrated circuit 50 and a corresponding overlapped portion of interposer 76. In this way, extension 102 is in a position to provide mechanical support to display driver integrated circuit 50 and interposer 76. A filler 92 may be included between support structure 90 and display driver integrated circuit 50 and/or interposer 76. Filler 92 may contact both support structure 90 and display driver integrated circuit 50 and/or interposer 76 to mitigate vertical deflection of display driver integrated circuit 50 and/or interposer 76 in the event of an impact event (e.g., when the device is dropped).

In some cases, filler 92 may be formed from a conformal material that conforms to an upper surface and edges of display driver integrated circuit 50. The conformal material may be deposited in a liquid state to ensure the material fills the gap between support structure 90 and display driver integrated circuit 50 and conforms to display driver integrated circuit 50. The conformal material may subsequently be solidified to ensure the material maintains its shape/ structural integrity during operation. Filler 92 in this type of arrangement may be epoxy, as an example.

In another possible example, filler 92 may be formed from a solid plastic spacer that is attached to support structure 90 and/or display driver integrated circuit 50 with adhesive. In this case, the filler is attached in a solid state and serves as a spacer between support structure 90 and display driver integrated circuit 50 and/or interposer 76.

Using interposer 76 in device 10 provides advantages in addition to reducing the footprint of substrate 26. Bonding processes for contacts on substrate 26 may be temperature limited due to manufacturing constraints associated with the silicon substrate. Due to these temperature constraints, soldering may not be available as an attachment technique for contacts on substrate 26. This is why anisotropic conductive films (ACF) may be used as the attachment structure for contacts on substrate 26.

With the arrangement of FIG. 3, where display driver integrated circuit 50 is attached directly to the substrate 26, solder is not available as an attachment structure between display driver integrated circuit 50 and substrate 26 due to the temperature constraints. However, in FIG. 4, where display driver integrated circuit 50 is attached to interposer 76, the display driver integrated circuit to interposer bonds may be made before the module is attached to substrate 26. Therefore, the display driver integrated circuit to interposer bonds may be made using a higher temperature process (e.g., soldering).

Said another way, in FIG. 4, conductive bonding structures 54 (between interposer 76 and DDIC 50) may have a higher melting point than conductive bonding structures 88 (between interposer 76 and substrate 26). Conductive bonding structures 54 may be formed from solder while conductive bonding structures 88 may be formed from ACF.

Another advantage to using interposer 76 in device 10 is that interposer 76 may be designed to include additional circuitry 80 for the electronic device. Additional circuitry 80 may be timing circuitry for operating the display (e.g., gate driver circuitry 20B as in FIG. 2), power delivery circuitry for delivering power to the display, or any other desired circuitry. Including timing circuitry (e.g., gate driver circuitry 20B in FIG. 2) in interposer 76 allows for the timing circuitry to be removed from substrate 26, further reducing the footprint requirements for substrate 26. Power delivery circuitry may sometimes be included in rigid printed circuit board 74. Moving the power delivery circuitry from rigid printed circuit board 74 to interposer 76 results in the power delivery circuitry being closer to substrate 26, offering performance improvements.

The example of including a dedicated interposer structure as in FIG. 4 is merely illustrative. In another possible arrangement, shown in FIG. 5, display driver integrated circuit 50 may itself serve as interposer that bridges a gap between flexible printed circuit 60 and substrate 26. Display driver integrated circuit 50 includes contacts 52 (sometimes referred to as contact pads 52). Some of the contacts 52 are configured to electrically connect to contacts 56 (sometimes referred to as contact pads 56 or bond pads 56) in substrate 26. Contacts 52 of display driver integrated circuit 50 may be bonded to contacts 56 of substrate 26 using conductive bonding structures 54 (sometimes referred to as conductive interconnect structures 54, conductive attachment structures 54, etc.). Conductive bonding structures 54 may be, for example, formed from anisotropic conductive films (ACF). A conductive bonding structure 54 is interposed between each respective contact 52 and contact 56. The conductive bonding structures 54 may form a physical and electrical connection between DDIC 50 and substrate 26.

There may be an array of contacts 56 that are configured to be electrically connected to the DDIC contacts 52 using conductive structures 54. There may be more than 1,000 total contacts 56, more than 3,000 total contacts 56, more than 5,000 total contacts 56, more than 7,000 total contacts 56, more than 8,000 total contacts 56, more than 9,000 total contacts 56, etc. The array of contacts 56 may have more than five rows, more than ten rows, more than twenty rows, more than thirty rows, etc. The array of contacts 56 may have more than 100 columns, more than 200 columns, more than 300 columns, more than 400 columns, etc.

Display driver integrated circuit 50 may receive signals from flexible printed circuit 60. The flexible printed circuit 60 may be coupled directly to contacts 52 in display driver integrated circuit 50.

Flexible printed circuit 60 includes one or more contacts 96 (sometimes referred to as contact pads 96) and one or more contacts 68 (sometimes referred to as contact pads 68). Contacts 96 are electrically connected to a respective contact 52 (sometimes referred to as contact pads 52 or bond pads 52) in DDIC 50 by conductive bonding structures 98 (sometimes referred to as conductive interconnect structures 98, conductive attachment structures 98, etc.). Contacts 68 are electrically connected to a respective contact 72 (sometimes referred to as contact pads 72 or bond pads 72) in rigid printed circuit board 74 by conductive bonding structures 70 (sometimes referred to as conductive interconnect structures 70, conductive attachment structures 70, etc.). Conductive bonding structures 70 and 98 may be, for example, formed from anisotropic conductive films. A conductive bonding structure 98 is interposed between each respective contact 96 and contact 52. The conductive bonding structures 98 may form a physical and electrical connection between flexible printed circuit 60 and DDIC 50. A conductive bonding structure 70 is interposed between each respective contact 68 and contact 72. The conductive bonding structures 70 may form a physical and electrical connection between flexible printed circuit 60 and rigid printed circuit board 74.

Figure 5:
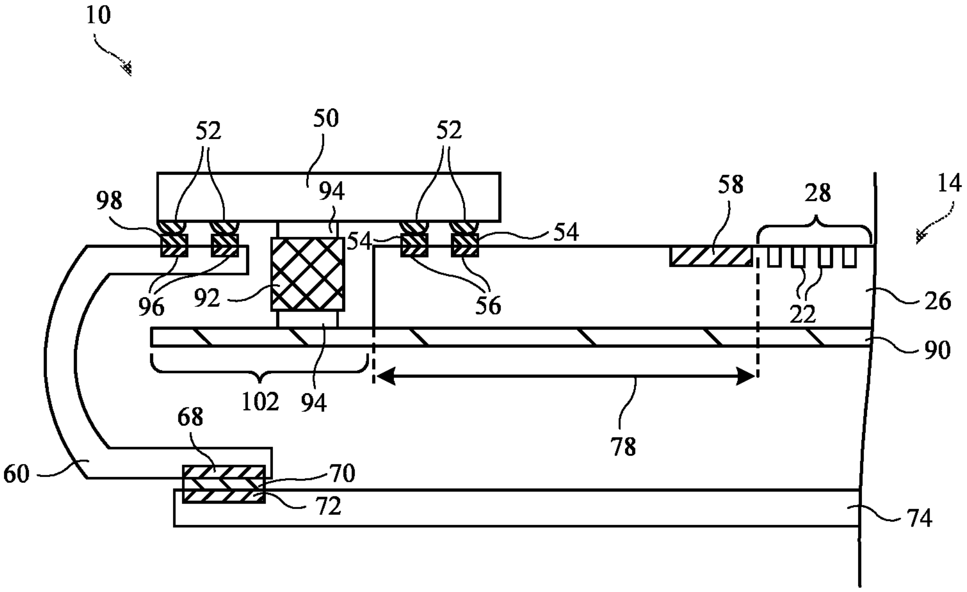
FIG. 5 is a cross-sectional side view of an illustrative electronic device with a display driver integrated circuit that serves as an interposer structure in accordance with an embodiment.

During operations of the electronic device of FIG. 5, signals for operating the display (e.g., control signals and/or display data) may be provided from control circuitry within rigid printed circuit board 74 to flexible printed circuit 60. The flexible printed circuit 60 conveys the signals to DDIC 50 (e.g., to some of contact pads 52). Thereafter, display driver integrated circuit 50 may output corresponding signals for operating the display to substrate 26 (e.g., to the contact pads 56). The signals from display driver integrated circuit 50 may subsequently be used by circuitry within substrate 26 to operate the display.

In FIG. 3, contacts are needed in substrate 26 to both provide signals to DDIC 50 and receive signals from DDIC 50. In FIG. 5, contacts are only needed to receive signals from DDIC 50.

In FIG. 3, a contact 66 is present in substrate 26 to electrically connect to the flexible printed circuit 60. In FIG. 5, this contact is omitted (and instead the flexible printed circuit is connected to DDIC 50).

Due to the omission of these components on substrate 26 in FIG. 5, the footprint of silicon layer 26 in FIG. 5 only needs to be sufficiently large to accommodate the partial footprint of DDIC 50. In FIG. 5, display driver integrated circuit 50 only partially overlaps silicon layer 26. As shown in FIG. 5, there is a distance 78 between the edge of the pixel array (e.g., a light-emitting active area for the display) and an edge of substrate 26. In FIG. 5, distance 78 needs to be sufficiently large to accommodate cathode contact 58 and contact pads 56 that couple to the DDIC 50. Distance 78 in FIG. 5 is less than distance 78 in FIG. 3 due to the space saved by omitting the contact pad for the flexible printed circuit (e.g., contact 66 in FIG. 3) and by omitting some of contacts 56 for the display driver integrated circuit.

Distance 78 in FIG. 5 may be less than 10 millimeters, less than 5 millimeters, less than 3 millimeters, less than 2 millimeters, less than 1 millimeter, greater than 1 millimeter, between 2 millimeters and 5 millimeters, etc. The smaller footprint of substrate 26 in FIG. 5 relative to FIG. 3 allows for more silicon dice to fit on a silicon wafer during manufacturing.

To ensure the mechanical reliability of DDIC 50 in FIG. 5, a support structure extension may be present. As shown in FIG. 5, a support structure 90 may be present below substrate 26. Support structure 90 may physically support substrate 26 within the electronic device. Support structure 90 may also be formed from a thermally conductive material and therefore serve as a heat sink for substrate 26. Support structure 90 may therefore sometimes be referred to as heat sink structure 90 or heat sink 90. Support structure 90 may have a thermal conductivity (in units of $W \times m^{-1} \times K^{-1}$) that is greater than 50, greater than 100, greater than 200, greater than 300, greater than 400, greater than 500, etc.

As shown in FIG. 5, support structure 90 may have an extension 102 that extends past an edge of substrate 26. Extension 102 may be formed under a portion of display driver integrated circuit 50. In this way, extension 102 is in a position to provide mechanical support to display driver integrated circuit 50. A filler 92 may be included between support structure 90 and display driver integrated circuit 50. Filler 92 may contact both support structure 90 and display driver integrated circuit 50 to mitigate vertical deflection of display driver integrated circuit 50 in the event of an impact event (e.g., when the device is dropped).

As previously discussed in connection with FIG. 4, filler 92 may be formed from a liquid-dispensed material that conforms to DDIC 50 or a solid structure that is attached using adhesive. FIG. 5 shows an example of the latter arrangement, with filler 92 attached to an upper surface of support structure 90 with a first adhesive layer 94 and attached to a lower surface of DDIC 50 with a second adhesive layer 94.

Although the aforementioned arrangements for the display driver integrated circuit have been described in relation to an organic light-emitting diode display, it should be noted that the aforementioned arrangements may be used for any desired display type (a microLED display, a liquid crystal display, etc.).

It should be noted that the example in FIGS. 3-5 of flexible printed circuit 60 being bent is merely illustrative. In some cases, flexible printed circuit 60 may not be bent. In general, flexible printed circuit 60 may have any desired shape and bending profile. Moreover, flexible printed circuit does not necessarily need to be bonded to rigid printed circuit board 74 (e.g., using structures 68, 70, and 72). Other arrangements may be used if desired.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
- a silicon substrate;
- an array of display pixels formed on the silicon substrate;
- an interposer structure that is attached to the silicon substrate;
- a display driver integrated circuit that is attached to the interposer structure, wherein the display driver integrated circuit is configured to provide data to the array of display pixels through the interposer structure;
- a rigid printed circuit board;
- a flexible printed circuit that is attached to the rigid printed circuit board and the interposer structure, wherein the silicon substrate has an edge and wherein the interposer structure bridges a gap between the flexible printed circuit and the edge of the silicon substrate; and
- a support structure that supports the silicon substrate, wherein the support structure has a portion that extends past the edge of the silicon substrate towards the flexible printed circuit, and wherein the display driver integrated circuit is interposed between the portion of the support structure and the interposer structure.

2. The electronic device defined in claim 1, wherein the interposer structure comprises silicon.

3. The electronic device defined in claim 1, wherein the interposer structure has a first portion that is attached to the silicon substrate, a second portion that is attached to the display driver integrated circuit, and a third portion that is attached to the flexible printed circuit.

4. The electronic device defined in claim 3, wherein the first portion comprises a first plurality of contact pads that is electrically connected to a respective second plurality of contact pads in the flexible printed circuit, wherein the second portion comprises a third plurality of contact pads that is electrically connected to a respective fourth plurality of contact pads in the display driver integrated circuit, and wherein the third portion comprises a fifth plurality of contact pads that is electrically connected to a respective sixth plurality of contact pads in the silicon substrate.

5. The electronic device defined in claim 4, wherein the fifth plurality of contact pads is electrically connected to the sixth plurality of contact pads using anisotropic conductive films.

6. The electronic device defined in claim 5, wherein the third plurality of contact pads is electrically connected to the fourth plurality of contact pads using solder.

7. The electronic device defined in claim 1, further comprising:
- a filler that is interposed between the portion of the support structure and the display driver integrated circuit, wherein the filler conforms to the display driver integrated circuit.

8. The electronic device defined in claim 1, wherein the flexible printed circuit has first and second opposing ends, wherein the first end is attached to the rigid printed circuit board, and wherein the second end is attached to the interposer structure.

9. The electronic device defined in claim 8, wherein the flexible printed circuit is bent between the first and second ends.

10. The electronic device defined in claim 1, wherein the interposer structure includes power delivery circuitry.

11. An electronic device comprising:
- a silicon substrate;
- an array of display pixels formed on the silicon substrate;
- a rigid printed circuit board;
- a flexible printed circuit that is attached to the rigid printed circuit board;

a display driver integrated circuit that is configured to provide data to the array of display pixels, wherein the display driver integrated circuit bridges a gap between the flexible printed circuit and the silicon substrate, wherein a first portion of the display driver integrated circuit is attached to the flexible printed circuit, and wherein a second portion of the display driver integrated circuit is attached to the silicon substrate;

a support structure that supports the silicon substrate and is overlapped by the silicon substrate, wherein the support structure has an extension that extends past an edge of the silicon substrate and is not overlapped by the silicon substrate; and a spacer interposed between the extension and the display driver integrated circuit.

12. The electronic device defined in claim 11, wherein the flexible printed circuit has first and second opposing ends, wherein the first end is attached to the rigid printed circuit board, wherein the second end is attached to the display driver integrated circuit, and wherein the flexible printed circuit is bent between the first and second ends.

13. An electronic device comprising:

a silicon substrate;

an array of display pixels formed on the silicon substrate;

a silicon interposer having a first contact that is bonded to a respective second contact in the silicon substrate, wherein the silicon interposer has opposing first and second surfaces;

a display driver integrated circuit having a third contact that is bonded to a respective fourth contact in the silicon interposer, wherein the first contact and the fourth contact are located on the first surface of the silicon interposer and wherein the display driver integrated circuit is configured to provide data to the array of display pixels through the silicon interposer;

a flexible printed circuit having a fifth contact that is bonded to a respective sixth contact in the silicon interposer; and a rigid printed circuit board having a seventh contact that is bonded to a respective eighth contact in the flexible printed circuit, wherein the flexible printed circuit is interposed between the first surface of the silicon interposer and the rigid printed circuit board in a direction perpendicular to the first surface of the silicon interposer.

14. The electronic device defined in claim 11, wherein the first portion overlaps the flexible printed circuit in a first direction and the second portion overlaps the silicon substrate in the first direction.

15. The electronic device defined in claim 11, wherein the display driver integrated circuit has a first contact that is bonded to a respective second contact in the flexible printed circuit, and wherein the display driver integrated circuit has a third contact that is bonded to a respective fourth contact in the silicon substrate.

16. The electronic device defined in claim 1, wherein the support structure serves as a heat sink for the silicon substrate.

17. The electronic device defined in claim 13, further comprising:

a heat sink structure that supports the silicon substrate, wherein the heat sink structure has a portion that extends past the edge of the silicon substrate.

18. The electronic device defined in claim 11, wherein the spacer comprises a plastic spacer.

19. The electronic device defined in claim 11, wherein the spacer is attached to at least the extension or the display driver integrated circuit with adhesive.

20. The electronic device defined in claim 11, wherein the array of display pixels emit light in a first direction and wherein the flexible printed circuit is interposed between the display driver integrated circuit and the rigid printed circuit board in a second direction parallel to the first direction.

* * * * *